United States Patent
Moreira et al.

(10) Patent No.: US 6,677,884 B2
(45) Date of Patent: Jan. 13, 2004

(54) SATELLITE CONFIGURATION FOR INTERFEROMETRIC AND/OR TOMOGRAPHIC REMOTE SENSING BY MEANS OF SYNTHETIC APERTURE RADAR (SAR)

(75) Inventors: Alberto Moreira, Garching (DE); Gerhard Krieger, Planegg (DE); Josef Mittermayer, München (DE)

(73) Assignee: Deutsches Zentrum fur Luft-und Raumfahrt e.V., Köln (DE)

( * ) Notice: Subject to any disclaimer, the term of this patent is extended or adjusted under 35 U.S.C. 154(b) by 0 days.

(21) Appl. No.: 10/186,829

(22) Filed: Jul. 1, 2002

(65) Prior Publication Data

US 2003/0006927 A1 Jan. 9, 2003

(30) Foreign Application Priority Data

Jul. 5, 2001 (DE) ........................................ 101 32 723

(51) Int. Cl.7 ............................................... G01S 13/90
(52) U.S. Cl. ...................... 342/25; 244/158 R; 342/147; 342/156; 342/175; 342/190; 342/191; 342/195; 342/417; 342/422; 342/423; 342/424
(58) Field of Search .......................... 342/25, 147, 156, 342/175, 195, 357.01, 357.02–357.17, 417, 422–424, 22, 176–194; 244/158 R, 158 A, 164–173; 701/226; 455/12.1

(56) References Cited

U.S. PATENT DOCUMENTS

| | | | | |
|---|---|---|---|---|
| 3,243,706 A | * | 3/1966 | Grisham | 244/158 R |
| 4,602,257 A | | 7/1986 | Grisham | |
| 4,727,373 A | * | 2/1988 | Hoover | 342/25 |
| 4,809,935 A | * | 3/1989 | Draim | 244/158 R |

(List continued on next page.)

FOREIGN PATENT DOCUMENTS

| | | |
|---|---|---|
| DE | 199 29 143 A1 | 6/1999 |
| DE | 199 38 592 A1 | 8/1999 |
| EP | 1 065 518 A2 | 1/2003 |
| EP | 1 065 518 | 1/2003 |
| FR | 2 787 185 | 6/2000 |
| WO | WO99/58997 | 11/1999 |

OTHER PUBLICATIONS

Massonnet, D. (2001) "Capabilities and Limitations of the Interferometric Cartwheel" IEEE Transactions on Geoscience and Remote Sensing, Bd. 39, No. 3, pp. 506–520.
Vincent, M.A. (1993) "Design of the TOPSAT Mission" AAS/AIAA Astrodynamics Conference, Bd. 85, No. 1, pp. 1137–1146.

(List continued on next page.)

Primary Examiner—Bernarr E. Gregory
(74) Attorney, Agent, or Firm—Collard & Roe, P.C.

(57) ABSTRACT

For interferometric and/or tomographic remote sensing by means of synthetic aperture radar (SAR) one to N receiver satellites and/or transmitter satellites and/or transceiver satellites with a horizontal across-track shift the same or differing in amplitude form a configuration of satellites orbiting at the same altitude and same velocity. Furthermore, a horizontal along-track separation, constant irrespective of the orbital position, is adjustable between the individual receiver satellites. In this arrangement one or more receiver satellites orbiting at the same altitude and with the same velocity are provided with a horizontal across-track shift varying over the orbit such that the maximum of the horizontal across-track shift occurs over a different orbital position for each satellite, the maxima of the horizontal across-track shifts are positioned so that the baselines are optimized for across-track interferometry. A transmitter or transceiver satellite is positioned either separate from the configuration without across-track shift or as part of the configuration with horizontal across-track shift.

9 Claims, 8 Drawing Sheets

U.S. PATENT DOCUMENTS

| | | | | |
|---|---|---|---|---|
| 4,854,527 A | * | 8/1989 | Draim | 244/158 R |
| 5,890,679 A | * | 4/1999 | Chethik | 244/158 R |
| 5,911,389 A | * | 6/1999 | Drake | 244/158 R |
| 5,923,278 A | * | 7/1999 | Poehler et al. | 342/25 |
| 5,931,417 A | * | 8/1999 | Castiel | 244/158 R |
| 6,007,027 A | * | 12/1999 | Diekelman et al. | 244/158 R |
| 6,011,505 A | * | 1/2000 | Poehler et al. | 342/25 |
| 6,032,902 A | * | 3/2000 | Palmade et al. | 244/158 R |
| 6,050,525 A | * | 4/2000 | Drake | 244/158 R |
| 6,102,335 A | * | 8/2000 | Castiel et al. | 244/158 R |
| 6,122,596 A | * | 9/2000 | Castiel | 701/226 |
| 6,264,143 B1 | * | 7/2001 | Massonnet | 244/158 R |
| 6,267,329 B1 | * | 7/2001 | Chethik | 244/158 R |
| 6,275,677 B1 | * | 8/2001 | Tandler | 455/12.1 |
| 6,388,606 B1 | | 5/2002 | Keydel et al. | |
| 6,452,532 B1 | * | 9/2002 | Grisham | 342/25 |
| 6,453,220 B1 | * | 9/2002 | Barker | 701/226 |
| 6,457,678 B1 | * | 10/2002 | Draim | 244/158 R |
| 6,552,678 B1 | | 4/2003 | Adragna | |

OTHER PUBLICATIONS

Zebker H.A., et al. (1994) "Mapping the World's Topography Using Tadar Interferometry: The TOPSAT Mission", Proceedings of the IEEE, Bd. 82, No. 12, pp. 1774–1786.

05288843, Nov. 1993, Patent Abstracts of Japan.

R. Schreiber et al. "Overview of interferometric data acquisition and processing modes of the experimental airborne SAR system of DLR", Proc. IGARSS'99, Hamburg, Germany, Jun. 1999, pp. 35–38 (Enclosed).

* cited by examiner

SATELLITE CONFIGURATION FOR INTERFEROMETRIC AND/OR TOMOGRAPHIC REMOTE SENSING BY MEANS OF SYNTHETIC APERTURE RADAR (SAR)

CROSS REFERENCE TO RELATED APPLICATIONS

Applicants claim priority under 35 U.S.C. §119 of German Application No. 101 32 723.4 filed Jul. 5, 2001.

FIELD OF THE INVENTION

The invention relates to a satellite configuration for interferometric and/or tomographic remote sensing by means of synthetic aperture radar (SAR).

BACKGROUND OF THE INVENTION

In a configuration involving a cluster of radar satellites, maintaining a baseline important for interferometry as stable as possible over a complete orbit is a problem. Baseline is termed the separation between two receiver satellites, a distinction being made between across-track baseline and along-track baseline. The first one is perpendicular to the velocity vector, serves to survey the ground level elevation and contributes by its component standing normal to the line connecting antenna and target point to sensing the ground level elevation. The along-track baseline designates the separation of two receiver satellites in the direction of the velocity vector (R. Schreiber et al., "Overview of interferometric data acquisition and processing modes of the experimental airborne SAR system of DLR", Proc. IGARSS'99, Hamburg, Germany, June 1999, pp. 35–38).

The following is an introduction to SAR systems, subsequently extended to cover interferometric SAR systems. Synthetic aperture radar (SAR) is a remote sensing instrument finding ever-increasing application in terrestrial and extraterrestrial mapping, surveillance and inspection. One such system has a platform moving at constant speed, an antenna looking downwards to the imaged scene and a coherent radar system which transmits periodic electromagnetic pulses. The direction of movement of the platform is termed the azimuth direction, the direction slanting downwards to the scene is termed the range direction. Shown in FIG. 1 is an interferometric SAR system including two satellites S1 and S2 with the baseline B. Θ designates the viewing angle. A conventional SAR system consists of one platform only, e.g. a satellite. In FIG. 1 a SAR satellite S1 is depicted flying over a swath to be mapped. In this arrangement, a high-resolution map in the azimuth and range direction of the backscatter coefficient of the swath is generated by signal processing the raw data sensed on fly-over.

The SAR system consisting of a platform (satellite, e.g. S1) is configured by a second satellite (S2) into an interferometric system. The gist of interferometry is by measuring the phase difference of two SAR images obtained from differing perspectives to obtain additional information with which, for instance, an indication as to the relative difference in elevation of all targets in the swath can be derived. This phase difference is a result of the slight differences in range between target and the two antennas.

For the accuracy in elevation sensing it is the so-called baseline that is deciding. In FIG. 1 the baseline is illustrated as the line connecting S1 and S2. FIG. 1 shows precisely the case in which the baseline is perpendicular to the velocity vector of the satellite S1 and normal to the line connecting the satellite S1 and a target on the ground. This baseline is termed normal baseline, it being decisive for elevation sensing. When two satellites orbit at precisely the same altitude, in the same azimuth position and on parallel orbits, it is only the resulting normal baseline that contributes towards elevation sensing. The same applies to the case of two satellites orbiting precisely one above the other in thus forming a vertical baseline. Here too, it is only the resulting normal baseline that contributes towards elevation sensing. The end product of sensing the elevation is a so-called digital elevation model (DEM).

Referring now to FIG. 2 there is illustrated an interferometric system for along-track interferometry. In this arrangement the two satellites S1 and S2 are on the same orbit but slightly shifted in the flight direction. If the satellites are on differing orbits, along-track interferometry is likewise possible, it being, however, only the shift of the two satellites in the flight direction that is decisive for each constellation. Along-track interferometry is used for sensing the velocity and detecting moving targets. A typical example application of along-track interferometry is surface flow observation.

There are basically two possibilities for configuring an interferometric cluster of at least two satellites, namely multi-pass interferometry and single-pass interferometry. In multi-pass interferometry the site under observation is flown over with a SAR sensor temporally delayed with a slightly differing flight path depending on the requirement for along-track or across-track interferometry. Multi-pass interferometry is implemented successfully with the ERS-1 satellite, for example.

For single-pass interferometry at least two SAR sensors are needed and the site under observation is mapped by both sensors simultaneously. The advantage of single-pass interferometry is that the site under observation does not change between the individual SAR maps, ensuring high coherence between the two sets of interferometric data.

The disadvantage of single-pass interferometry is that several SAR sensors are needed which, as a rule, adds to the costs. Instead of two satellites a rigid design having a sufficiently long baseline between the SAR antennas may be used. This achievement was made use of in the SRTM mission.

A further achievement of the interferometric principle is the interferometric cartwheel (WO 99/58997 by D. Massonnet "Roue interférométrique") in which a cluster of satellites describes a revolution about a virtual cartwheel center by using slightly elliptical orbits with different arguments of perigee. The configuration provided consists of, for example, three receiver satellites forming together a cartwheel and SAR transmitter which, more particularly, may be an already existing SAR sensor.

Referring now to FIG. 3 there is illustrated one such cartwheel center, where $\Theta_{sq}$ designates the bistatic squint angle. During an orbit the individual cartwheel satellites describe a complete ellipse about the cartwheel center, both across-track (vertical) and along-track baselines occuring between the individual cartwheel satellites. Depending on the particular application the satellites most favorable for the application can be selected from the SAR receiver satellites.

For across-track interferometry, for example, the satellites always selected are those having the largest vertical (across-track) baseline. However, all along-track baselines may also be combined to enhance the performance of the along-track interferometry, the same optimization applying likewise to across-track interferometry for terrain topographie. (For along-track interferometry, for example, the satellites always selected are those having the optimum along-track baseline e.g. for water current mapping.)

The disadvantage of the cartwheel is that it cannot be optimized at the same time for along-track interferometry and across-track interferometry. The advantage is that maximum baselines (along or across, depending on the cartwheel expression) selected from a set of receiver satellites are highly stable over the complete orbit, i.e. vary little in length. A further disadvantage is that for safety reasons a large separation needs to be maintained between the cartwheel and the transmitter satellites. This separation results in a large bistatic squint and thus in a high Doppler centroid which makes signal processing very difficult and complicated.

In addition to along/across-track interferometry the cartwheel concept also offers the possibility of a superresolution by making use of angular differences resulting from the local offset of the receiver satellites in along-track and across-track at which the target area is observed. These angular differences result in a shift of the corresponding spectra in the azimuth and range direction. Joining the two spectra in azimuth and range produces an enhanced signal bandwidth and thus an improved resolution in azimuth and range. For a cartwheel with three satellites the geometric resolution can be enhanced up to a factor of 2 as compared to that of only one receiver satellite.

The disadvantages of two-pass interferometry lie in the temporal decorrelation of the two SAR images needed for interferometry. Although large baselines and thus good elevation sensitivity is provided in principle, the elevation accuracy suffers from temporal decorrelation.

Temporal decorrelation is no problem in single-pass interferometry because of the simultaneous fly-over of two SAR receivers. It is, however, the restricted length of the baseline that is of disadvantage which results in a restricted elevation sensitivity. Single-pass interferometry was achieved on the STRM mission by means of a second receiver antenna mounted on a 60 m long mast. However, a structure of this length already results in vibration problems which, although corrected in part, cause serious structural and cost-effective problems in even longer structures.

The cartwheel concept combines the possibility of a baseline of almost any size in across-track for a high elevation sensitivity whilst avoiding the temporal decorrelation as typical for single-pass interferometry. Although the cartwheel concept already makes for a major advancement in satellite platform SAR interferometry, it is the cartwheel configuration of the SAR satellites that results in the following new difficulties:

Orbit maintenance is difficult since the altitude and velocity of each satellite as part of the cartwheel varies all the time. Configuring the cartwheel structure also takes long and is risky. When a separate satellite is used as the transmitter, a large safety separation needs to be maintained away from the transmitter so as not to endanger it. When the transmitter satellite is integrated in the cartwheel it is possible to position it in the center of the cartwheel ellipse formed by the receiver satellites. There is generally a high risk of collision between the individual satellites making up the cartwheel and the transmitter satellite due to the problematic orbit constellation.

It is this large separation from the transmitter satellite (in the parasitic configuration of a separate transmitter satellite) that leads to a large squint angle formed by the lines connecting the transmitter to the target and the receivers to the target. This large squint angle produces Doppler centroids in the individual data sets which amount to several multiples of the PRF vals used, thus resulting in major difficulties in interferometric signal processing.

The along-track separation of the receiver satellites from each other results in a difference in the squint angle, as a result of which the azimuth bandwidth available for interferometric applications is substantially restricted (for example in the case of transmitter satellites having a high range bandwidth since this in principle makes a large across-track baseline possible).

Across-track interferometry and along-track interferometry cannot be simultaneously optimized. Across-track interferometry can be optimized by correspondingly selecting the diameter of the cartwheel ellipse. This, however, also defines the along-track baseline important for along-track interferometry. A favorable vertical baseline, for example, for the C band is in the range of one to several kilometers, resulting in maximum along-track baselines of likewise several kilometers. Due to the motion of the receiver satellites on the cartwheel ellipse both the across-track and the along-track baseline vary.

To avoid calibration points it is necessary to calibrate the complete system over the sea as was done, for example, on the SRTM mission. Therefore, the along-track separation of the receiver satellites suitable for calibration should be below the so-called correlation time for water surfaces.

This correlation time is a time duration derived from the roughness of the sea surface within which the two SAR images need to be mapped to ensure a useful coherence. For the C band this time duration is of the order of 57 ms, corresponding to an along-track separation of two satellites of roughly 400 m at an altitude of approximately 800 kilometer. Due to the variation of the along-track baseline with maxima of up to several kilometers for an optimized across-track baseline of the cartwheel, calibration over the sea is very difficult to achieve.

SUMMARY OF THE INVENTION

The invention is based on the objective of maintaining baselines over an orbit in a configuration involving a cluster of satellites as stable as possible. Furthermore, the satellite configuration is intended to be configured so that along-track interferometry and across-track interferometry can be implemented and optimized simultaneously.

In accordance with the invention this objective is achieved by a satellite configuration for interferometric and/or tomographic remote sensing by means of synthetic aperture radar (SAR) wherein one to N receiver satellites and/or transmitter satellites and/or transceiver satellites with (or partly with) a horizontal across-track shift the same or differing in amplitude are provided, the satellites orbiting at the same altitude and at the same velocity, and a horizontal along-track separation, constant irrespective of the orbital position, being adjustable between the individual receiver satellites.

For achieving the objective as well as solving the problems associated with prior art there is provided in accordance with the invention a constellation of a cluster of SAR receiver satellites, all orbiting, for example, on circular orbits the same in altitude and velocity. The required across-track baseline is achieved by the inclinations and/or ascending nodes of the individual receiver satellite orbits differing slightly.

An ascending node is the intersection of the equatorial plane and the orbit of the satellite on its way from the southern hemisphere to the northern hemisphere. Different ascending nodes of the receiver satellites result in a horizontal across-track shift which varies twice during an orbit between a maximum value and zero, the maximum of the horizontal across-track shift occurring over the equator while over the poles the orbits intersect. However, the maxima of the horizontal across-track shift may also be placed over the poles, the ascending nodes then being identical and the inclinations slightly differing. The maximum may also be positioned otherwise.

At the same time and independent of the across-track baseline an along-track baseline may be set by a minor shift in time of the receiver satellites in the direction of flight.

The constellation in accordance with the invention is also termed in the following cross-track pendulum and offers the following advantages:

Any temporal decorrelation is excluded due to the practically simultaneous fly-over of all receiver satellites.

An across-track baseline of any desired length can be formed as regards the requirements on across-track interferometry without having to take into account any structural restrictions of a cohesive construction.

Similar to the situation in a cartwheel configuration a highly stable maximum across-track baseline is attained, the maximum varying only between 87% and 100% of the absolute maximum when using three satellites.

Unlike the cartwheel configuration, the along-track baseline can be optimized irrespective of the across-track baseline, for example in oceanographic applications.

Orbit maintenance becomes very simple due to all receiver and transmitter satellites orbiting at the same altitude and velocity, thus greatly reducing the risk of a collision, unlike the situation in a cartwheel configuration.

The along-track separation between a transmitter satellite separate to the cross-track pendulum or one belonging thereto can now be configured substantially less than in the cartwheel concept due to the lower risk of collision. This results in the solution of the problem with high squint angles as occurring in the cartwheel concept in thus substantially facilitating interferometric signal processing of the satellite data which can now be done with standard methods of SAR interferometry.

Due to the independent optimization of the baselines for across-track interferometry and along-track interferometry, several missions can now be implemented in parallel. For example, with across-track interferometry a global terrain model can be generated whilst simultaneously implementing along-track interferometry for sensing the velocity of ocean currents or super-resolution.

Although maintaining the orbits of the satellites slightly differing in inclination necessitates additional fuel this is not a technological limitation. For example, the additional annual fuel requirement of a pendulum configuration with ENVISAT as illuminator amounts to only approximately 1% of the receiver satellite weight. By comparison, reference is made to the cartwheel mission in which fuel consumption is approximately 4.5% of the receiver satellite weight (approximately 2 year mission duration) for orbit control of the complete mission.

BRIEF DESCRIPTION OF THE DRAWINGS

The invention will now be detailed by way of the drawings in which.

DETAILED DESCRIPTION

Figure 1:
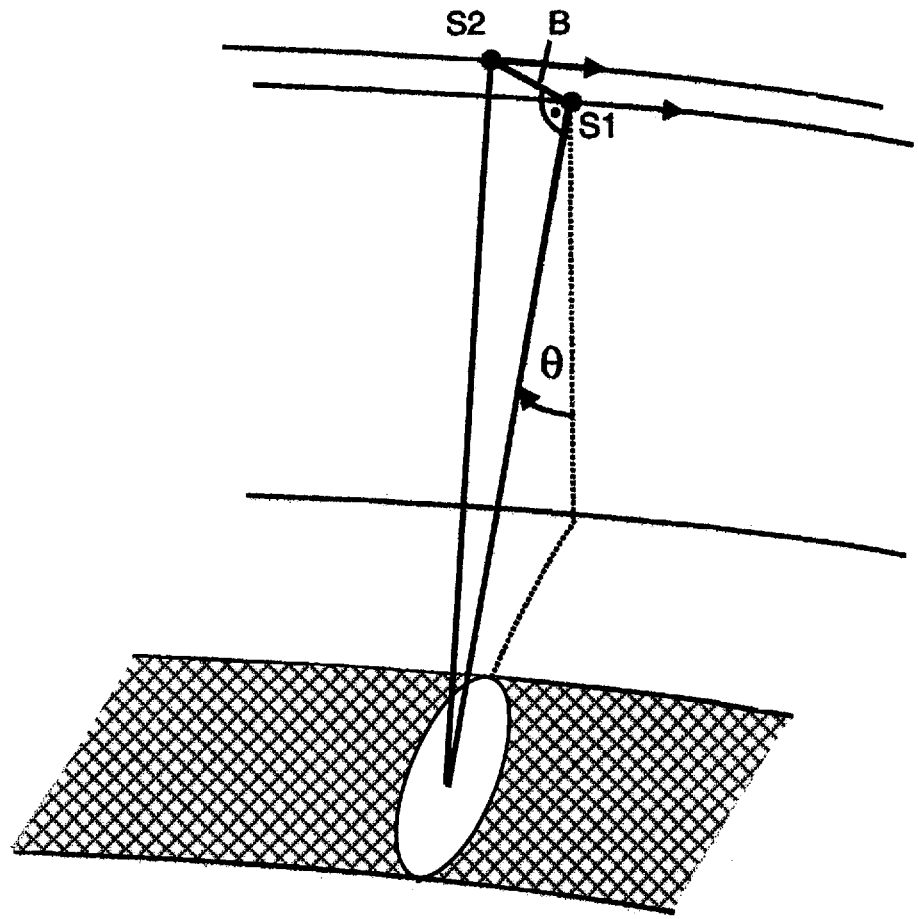
FIG. 1 is an illustration of the known geometry of an interferometric SAR system for elevation sensing by means of an across-track baseline.
Figure 2:
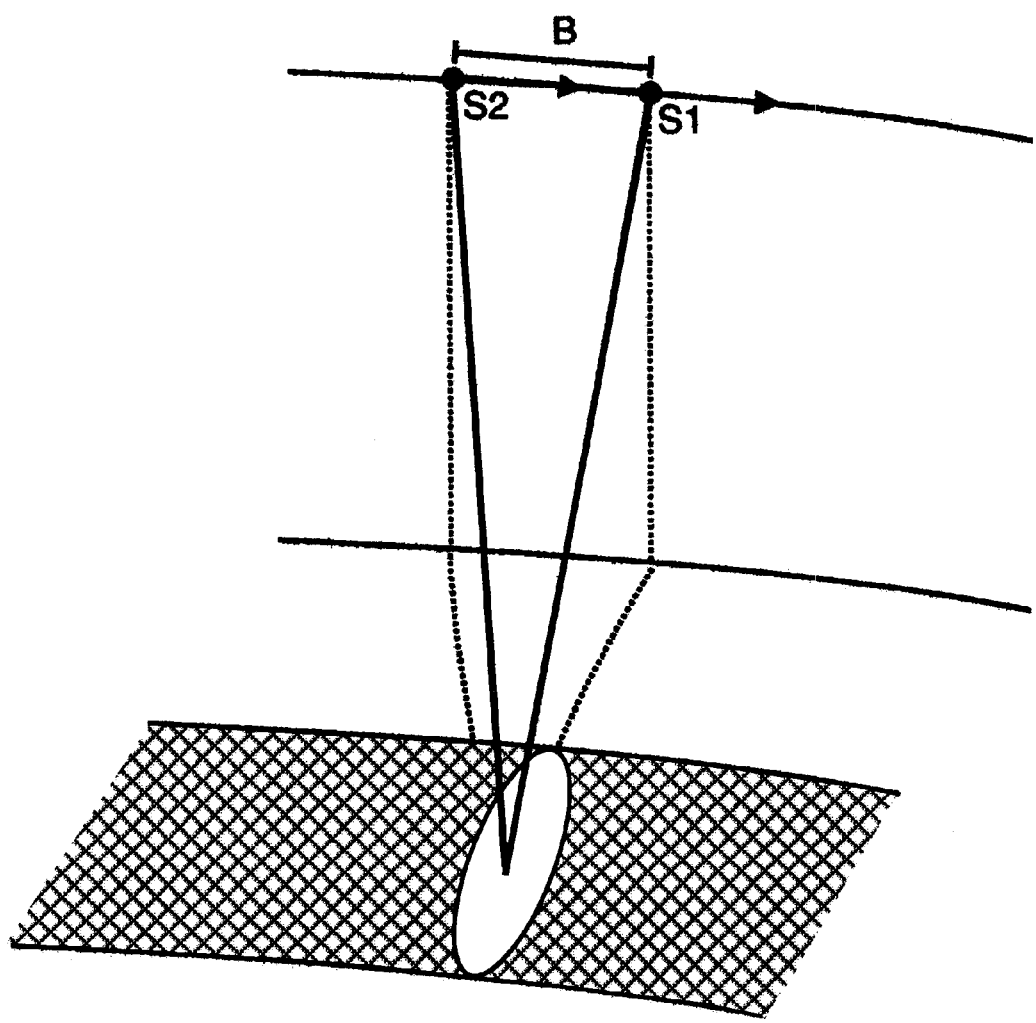
FIG. 2 is an illustration of the known geometry of an interferometric SAR system including an along-track baseline.
Figure 3:
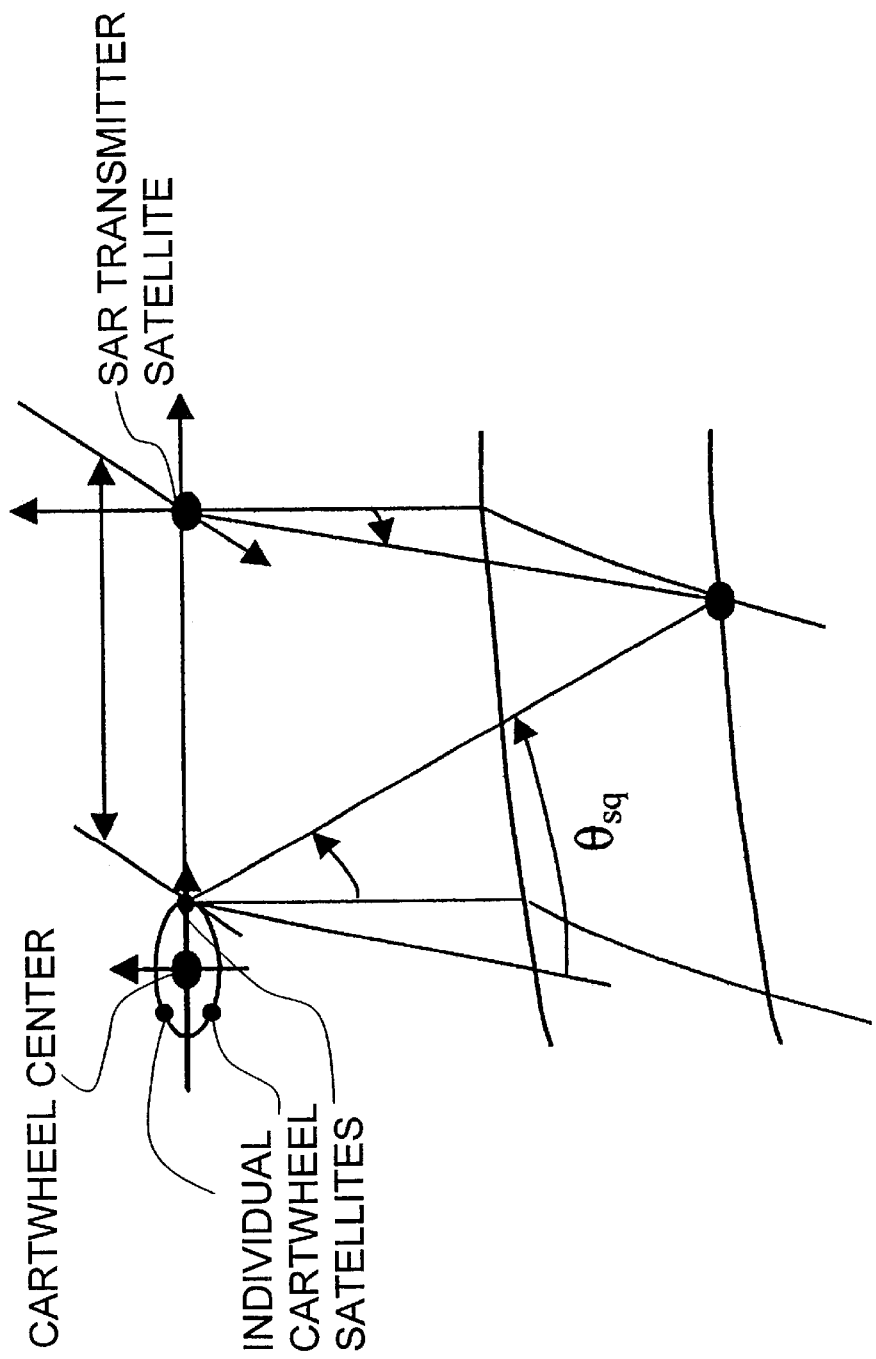
FIG. 3 is an illustration of an interferometric cartwheel configuration including a SAR transmitter satellite and three SAR receiver satellites forming the cartwheel about a virtual cartwheel center.
Figure 4:
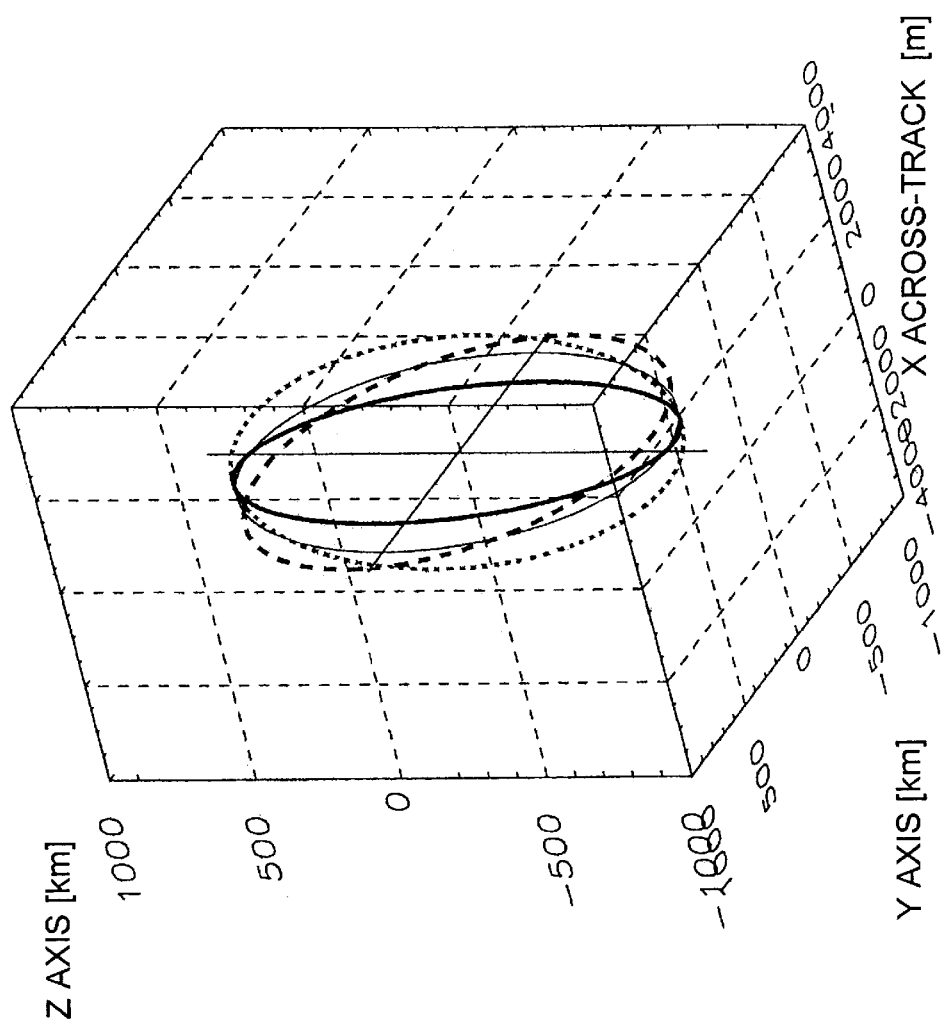
FIG. 4 is an example embodiment of an orbit track of three receiver satellites of the configuration in accordance with the invention.
Figure 4:
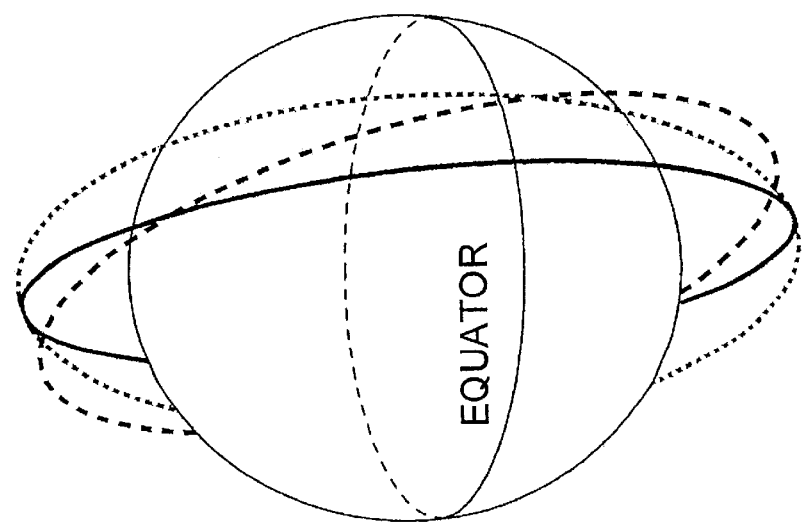

Referring now to FIG. 4 there is illustrated on the left the basic geometry of a satellite configuration in accordance with the invention of three (3) receiver satellites, not shown in detail, as illustrated only by their orbits. A transmitter (not shown) has in this example, like the receiver satellites, a circular orbit, but unlike the receiver satellites no across-track shift. It is to be noted that the horizontal across-track shift shown on the left in FIG. 4 is not to scale for a clearer indication of the satellite orbits.

Shown on the right in FIG. 4 is the orbit of the receiver satellites, assuming, for example, an altitude of 800 kilometer and a horizontal across-track shift of 600 m (not shown to scale). This situation assumes three satellites, although of course, any other number (from 2 to N) may be used. When using two satellites, however, a favorable baseline is attained only over certain latitudes, whereas when using three and more satellites a favorable baseline may be obtained over all latitudes. For safety reasons, the along-track shift should be at least 100 m in still obtaining a very good correlation over the ocean for calibration purposes.

Figure 5:
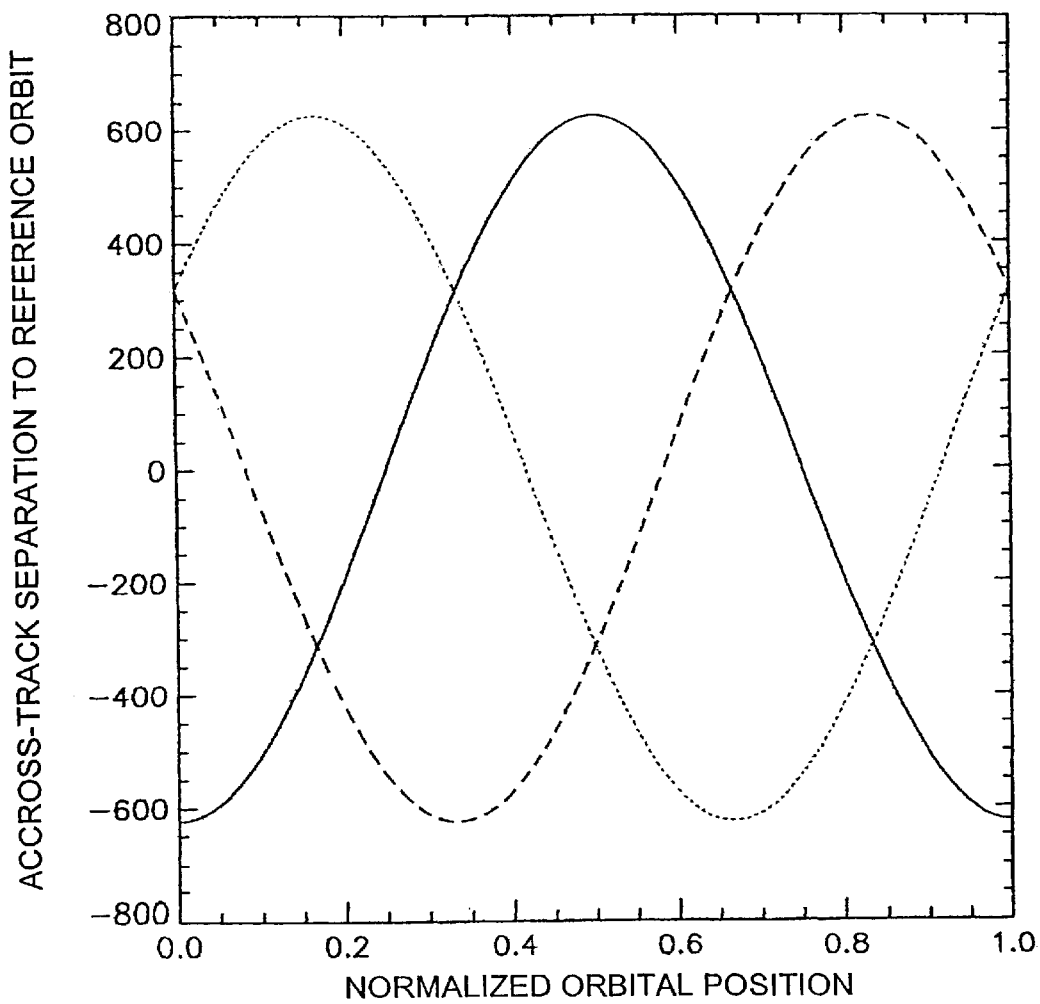
FIG. 5 is a graph of the variation of the across-track shift for three satellites shifted by a third of an orbit about an orbit track as for the configuration as shown in FIG. 4.

Referring now to FIG. 5 there is illustrated how the profile of the horizontal across-track shift of a satellite is a good approximation of a sinusoidal curve, the period of which corresponds to a single orbit, whereby the relative phase shift between the satellites is a third of an orbit (i.e. 120 deg.) in each case. The approximation used in this illustration is sufficient since the orbits of the satellites in remote sensing have an inclination of near 90 deg. and because the across-track shift is small (from a few 100 m to a few 10 km approximately, depending on the SAR system configuration). Even when the across-track shift is higher the advantages of the novel configuration as compared to the cartwheel configuration still hold.

Figure 6:
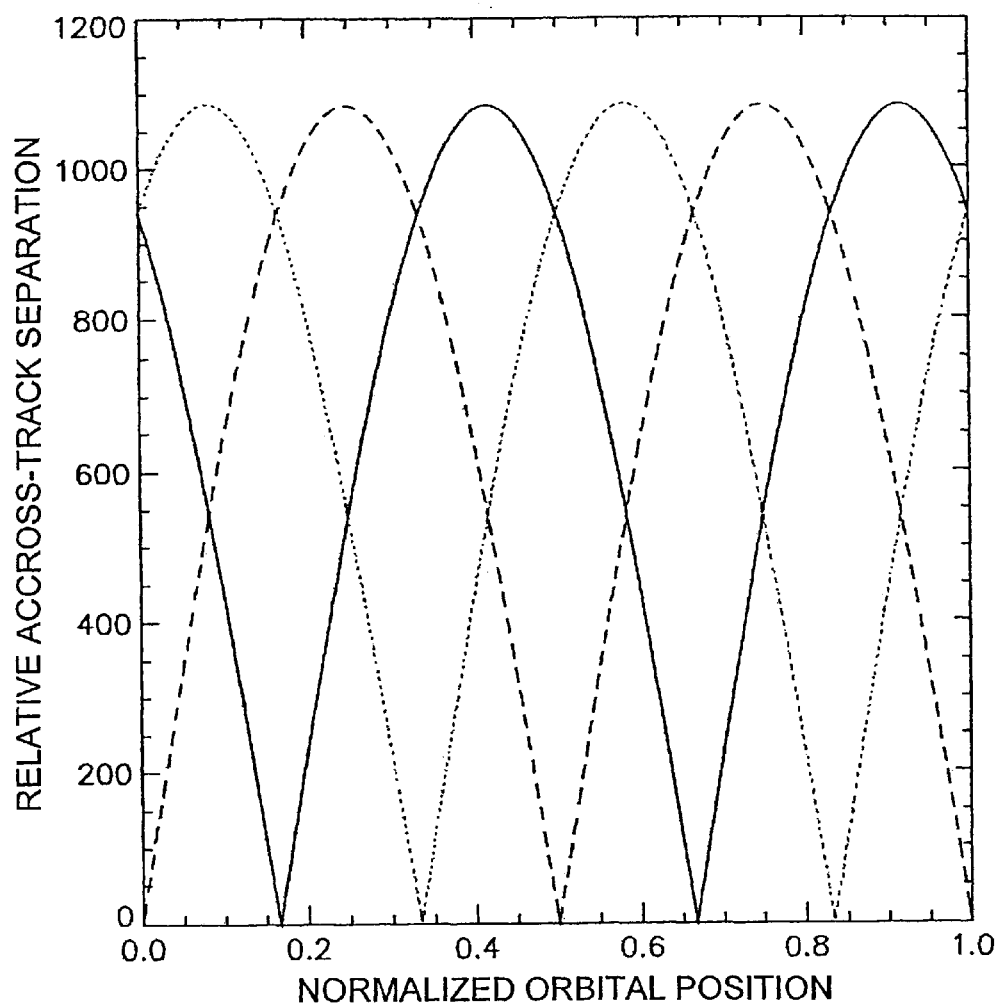
FIG. 6 is a graph showing the three differing across-track baselines materializing for the example of the three receiver satellites in varying over an orbit in accordance with the configuration as shown in FIG. 4.

Referring now to FIG. 6 there are illustrated the across-track baselines between three receiver satellites of the configuration in accordance with the invention as assumed by way of example. It is always the largest available baseline that is selected for across-track interferometry. It is evident from FIG. 6 how at least 87% of the largest occurring baseline is available as the maximum baseline for a configuration of three receiver satellites. Other smaller baselines may be used, for example, to assist unwrapping.

Further example embodiments for configurations having a horizontal across-track shift are listed in the following:

a) Instead of one of the satellites for receiving only, a transceiver satellite is used, doing away with the need for a separate transmitter satellite.

b) Use is made of a satellite for transmission only, devised especially for the cross-track pendulum.

c) Use is made of differing amplitudes of the across-track shift in the pendulum, for example for super-resolution.

d) Three satellites are used having the same amplitudes of the across-track shift of the pendulum, but differing in along-track shift, for example, for solving ambiguities in sensing ocean currents.

e) For along-track and/or across-track interferometry other configurations including one to N receiver satellites and/or transmitter satellites and/or transceiver satellites in using an across-track shift the same or differing in amplitude are possible.

f) For tomographic mapping configurations including one to N receiver satellites and/or transmitter satellites and/or transceiver satellites in using an across-track shift the same or differing in amplitude can also be provided.

g) Configurations including one to N receiver satellites and/or transmitter satellites and/or transceiver satellites in using an across-track shift the same or differing in amplitude can also be provided for super-resolution.

h) For a combination of the applications as listed under e) to g) configurations including one to N receiver satellites and/or transmitter satellites and/or transceiver satellites in using an across-track shift the same or differing in amplitude may be provided.

In addition to configurations with horizontal across-track shift diverse combinations with a vertical track shift are conceivable, resulting in eccentric orbits of at least some receiver satellites. Due to the variation in the velocity of the receiver satellites, however, this automatically results in an along-track shift as a function of the orbital position.

Figure 7:
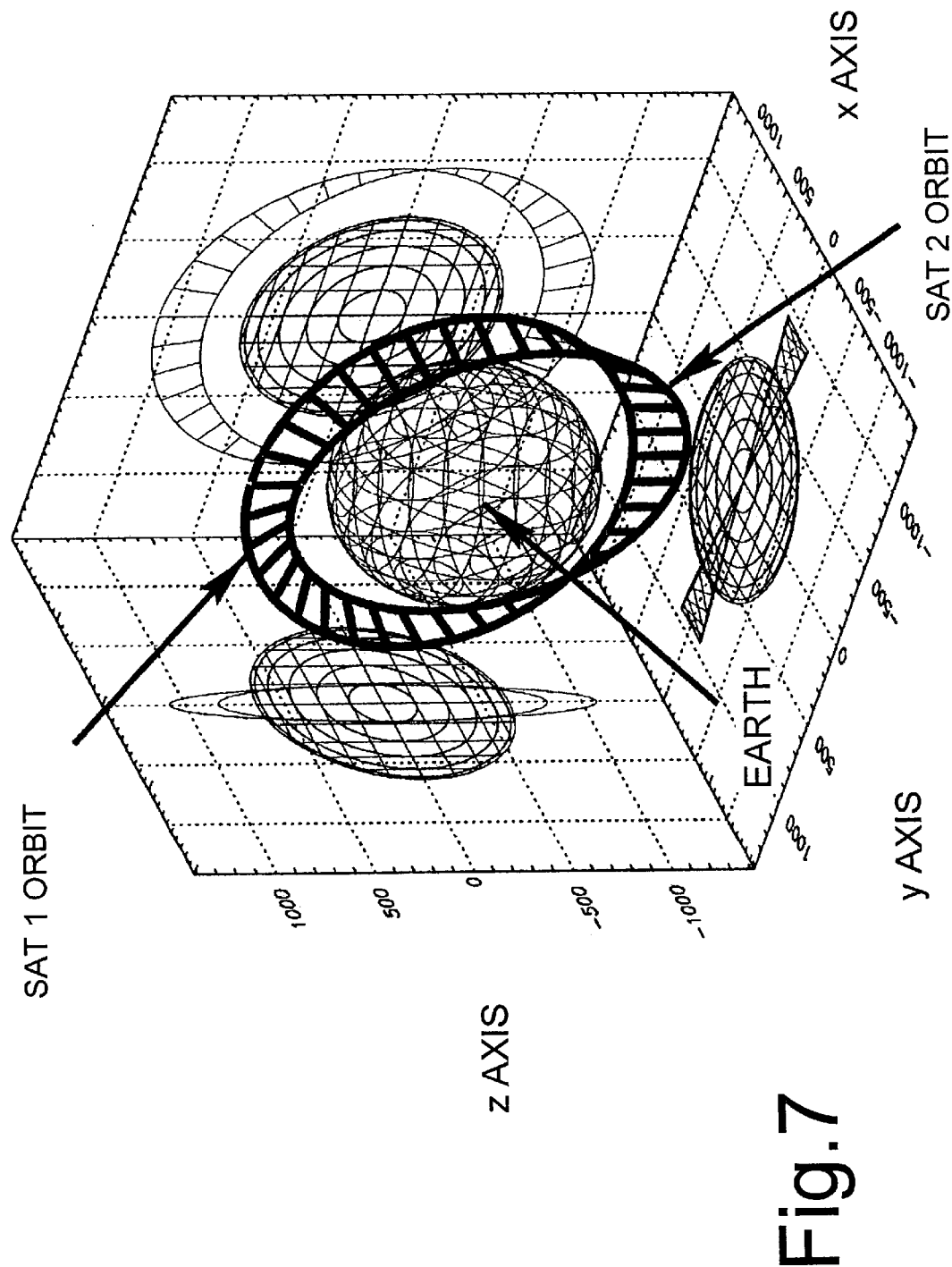
FIG. 7 is an example embodiment of the orbits of only two receiver satellites having vertical and horizontal across-track shift.

A few example embodiments will now be described in the following. Referring now to FIG. 7 there is illustrated the basic geometry of a configuration comprising two receiver satellites SAT1 and SAT2, the orbits of which lie in different planes, the same as in FIG. 4, i.e. slightly differing in inclination and/or ascending node. This results in a horizontal across-track baseline, the length of which fluctuates periodically as a function of the orbital position. This is illustrated in FIG. 7 by a projection to the xy plane.

Unlike FIG. 4 the satellites as shown in FIG. 7 additionally orbit elliptically. When the orbits have different eccentricities and/or the apogees (points most distant from the earth) point in differing directions, a vertical across-track baseline materializes in addition as a function of the orbital position, as illustrated in the yz plane.

Arranging for the minima of the vertical and horizontal across-track baselines to occur at different positions (e.g. shifted by 90° as shown in FIG. 7) produces a non-disappearing across-track shift at each orbital position when using just two satellites. For example, for the configuration as shown in FIG. 7 the length of the across-track baseline remains (almost) constant, since the amplitudes of the horizontal and vertical across-track shift were selected the same.

To make this clear, the across-track shifts resulting for different orbit positions identified thick-lined in FIG. 7.

Figure 8:
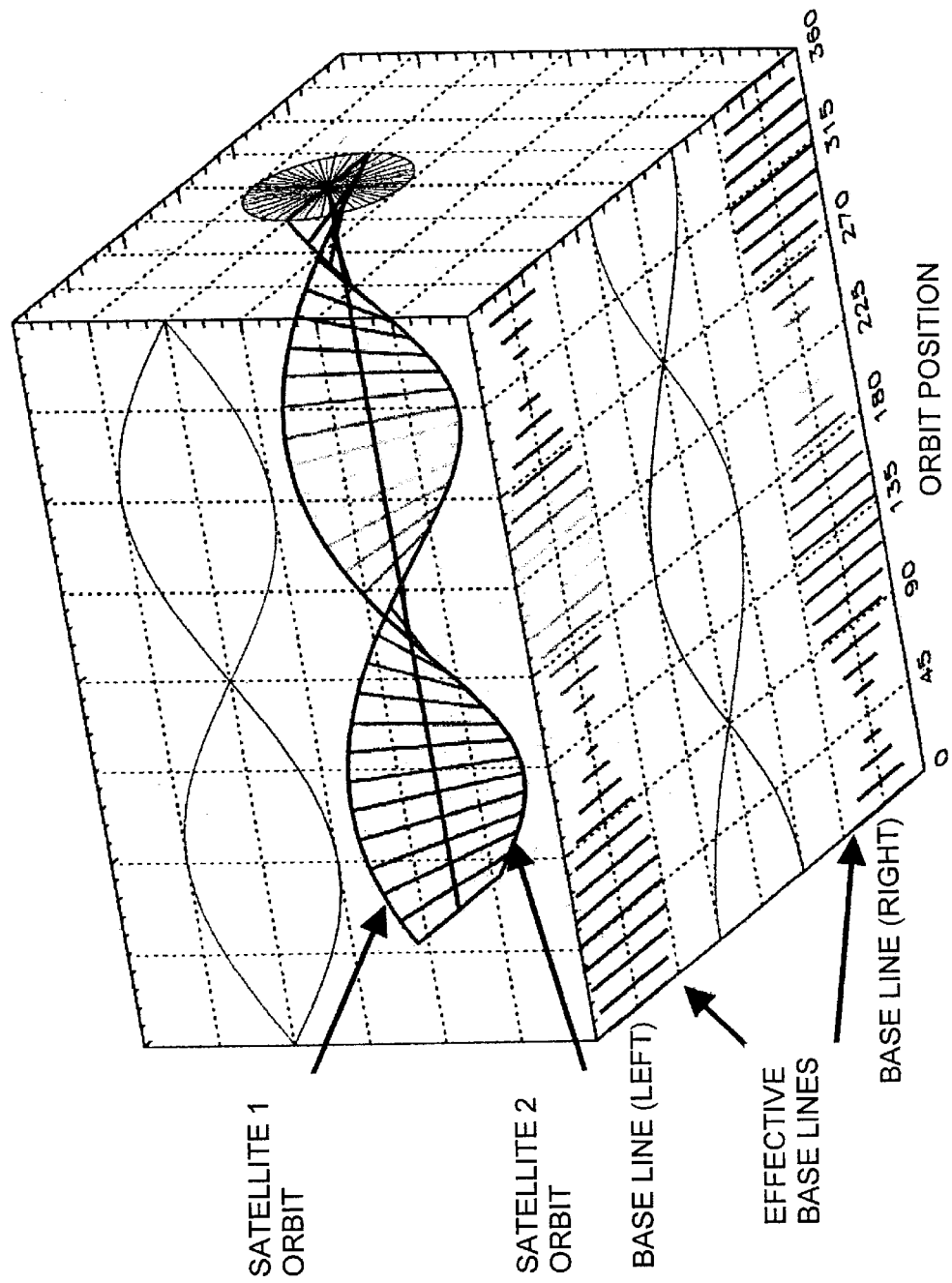
FIG. 8 is an illustration of fictive across-track baselines for a configuration of two satellites having vertical and horizontal across-track shift.

However, what is decisive for interferometric mapping is not the across-track shift of the satellites but the length of the effective baseline, i.e. the separation between the satellites resulting from an orthogonal projection in the viewing direction of the radar. Referring now to FIG. 8 there is illustrated for a complete orbit the effective across-track baseline obtained for a viewing angle of either −45° (on the left at the bottom) or +45° (on the right at the bottom). As evident, the length of the effective baseline fluctuates sinusoidally as a function of the orbital position, the baselines of the left-hand and right-hand side being 90° out of phase.

Selecting a transceiver configuration able to view to the left or right depending on the orbital position (for instance Radarsat II—a new satellite scheduled for launch in 2003—in conjunction with suitable rotating passive microsatellites) results in an effective across-track baseline always amounting to at least 71% of its maximum length in thus making it possible to map the complete surface of the earth interferometrically with just two receiver satellites. It is further intended to map the northern and southern hemispheres of the earth twice on every orbit, although it would be sufficient in principle to map them only once so that a configuration having only one direction of viewing (either to the left or to the right) would suffice for a complete mapping of the earth surface.

For example, for the configuration as shown in FIG. 8 viewing to the right, the assignment [80°, 90°, 180°, 270°, 360°]=[equator, south pole, equator, north pole, equator] may be selected. This results in the southern hemisphere being mapped in the ascending path between 90° and 180° and the northern hemisphere in the descending path between 270° and 360° with an effective baseline which always amounts to at least 71% of its maximum length. A further advantage of this special arrangement is that for the horizontal across-track shift no additional fuel is needed to compensate nodal drifts since the two orbits, although differing in their ascending nodes, have the same inclination.

Global coverage of the earth with an adequate baseline is possible in other configurations including also two receiver satellites with a looking view at only one side (e.g. shifted vertical only and horizontal only) but at the sacrifice of not mapping one and the same point from two opposite directions, i.e. two viewing angles, which is particular of interest where high slopes of the terrain are concerned. Further satellite configurations are possible with a combination of the horizontal and vertical across-track shift, for example for super-resolution and/or tomography. One advantage of such a combination is that the baseline ratio can be maintained constant for all orbital positions.

Further possible applications of such a configuration are tomography and super-resolution, the first requiring in general more than 3 receiver satellites.

For super-resolution two to three satellites are sufficient when the digital elevation model (DEM) of the area flown over is already known. Should the DEM not be known, two pendulum configurations can be combined with each other. In this arrangement the across-track shift for the pendulum for generating the DEM amounts up to roughly a third of the critical baseline whilst the across-track shift for the super-resolution is comparable to the critical baseline.

For tomography, even more than five receiver satellites differing in horizontal and/or vertical across-track shift may be used to achieve a good resolution in elevation. Multiple fly-over may also be used to generate a tomographic map. In this case, the temporal decorrelation is many factors better than in multi-pass tomography using only a single receiver satellite.

What is claimed is:

1. A satellite based synthetic aperture radar (SAR) system mapping a strip of an earth surface by use of a satellite configuration for interferometric remote sensing comprising:

a satellite carrying a SAR transmitter;

a cluster of orbiting SAR receiver satellites having varying horizontal across-track shifts;

said cluster having at least three SAR receiver satellites orbiting at an identical velocity on different circular orbits lying in different planes, said circular orbits differing in inclination, and differing in ascending, nodes where an equitorial plane and the respective orbits of said receiver satellites intersect, such that a maximum horizontal across-track shift occurs at a different orbit position for each satellite and horizontal across-track baselines result, said baselines having lengths which vary periodically over an orbit and a largest of said baselines being selected for across-track interferometry; and wherein a constant horizontal along-track separation is provided between individual ones of said receiver satellite irrespective of orbital position.

2. The synthetic aperture radar (SAR) system as set forth in claim 1 wherein said satellite carrying said SAR transmitter is separate from said cluster of SAR receiver satellites without across-track shift.

3. The synthetic aperture radar (SAR) system as set forth in claim 1 wherein said satellite carrying said SAR transmitter comprises a transceiver satellite forming a part of said cluster of SAR receiver satellites with horizontal across-track shift.

4. The synthetic aperture radar (SAR) system as set forth in claim 1 wherein three SAR receiver satellites orbit in three circular orbits lying in three different planes such that said horizontal across-track shifts vary over an orbit with identical amplitudes, and maxima of the horizontal across-track shift for each receiver satellite being staggered from each other by a third of the orbit, horizontal across-track baselines being formed between the three receiver satellites and varying periodically in length over an orbit with a largest of said baselines being selected for across-track interferometry, and wherein a constant horizontal along-track separation is provided between the three individual receiver satellites irrespective of orbital position.

5. The synthetic aperture radar (SAR) system as set forth in claim 1 wherein said SAR receiver satellites have a horizontal and a vertical across-track shift identical in amplitude.

6. The synthetic aperture radar (SAR) system as set forth in claim 1 wherein said SAR receiver satellites have a horizontal and a vertical across-track shift differing in amplitude.

7. A satellite based synthetic aperture radar (SAR) system mapping a strip of an earth surface by use of a satellite configuration for interferometric remote sensing comprising:

a satellite carrying a SAR transmitter;

two orbiting SAR receiver satellites having varying horizontal across-track shifts;

said two SAR receiver satellites orbiting on different elliptical orbits lying in different planes, said elliptical orbits differing in inclination, and differing in ascending nodes where an equatorial plane and the respective orbits of said receiver satellites intersect;

wherein said two receiver satellites have both a horizontal and a vertical across-track shift while orbiting in said two elliptical orbits to provide an across-track baseline sufficient for all orbital positions, said two orbits having points most distant from the earth, pointing in different directions such that the horizontal and vertical across-track baselines have minima occurring at different orbital positions to map the earth surface by an adequate across-track baseline.

8. The synthetic aperture radar (SAR) system as set forth in claim 7 wherein said satellite carrying said SAR transmitter is separate from said two orbiting SAR receiver satellites without across-track shift.

9. The synthetic aperture radar (SAR) system as set forth in claim 7 wherein said satellite carrying said SAR transmitter comprises a transmitter satellite forming a part of said two SAR receiver satellites with horizontal and vertical across-track shifts.

* * * * *